Dec. 22, 1931.
J. L. BREESE, JR
OIL BURNING APPARATUS
Re. 18,299
Original Filed Nov. 9, 1926
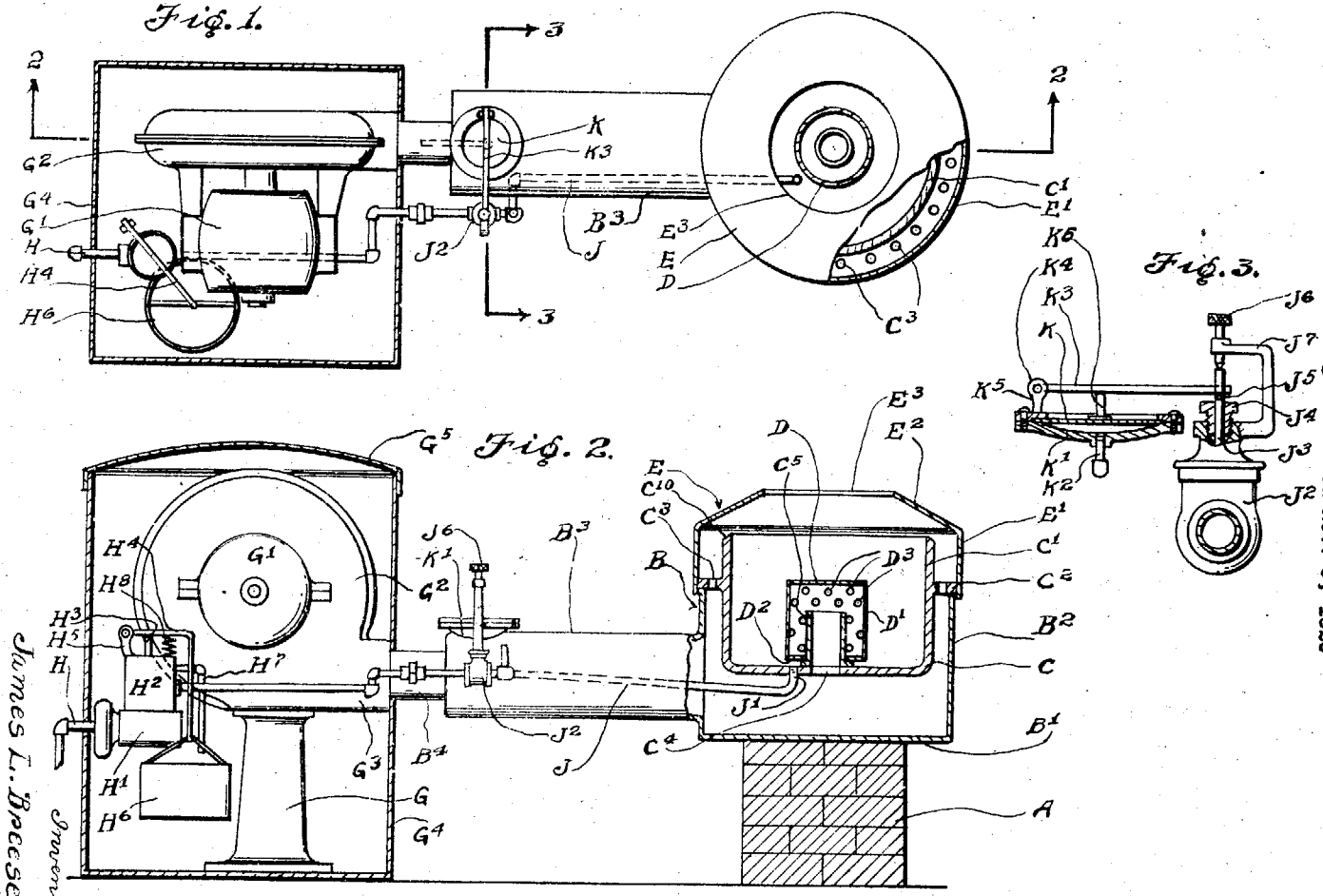
Inventor
James L. Breese, Jr.
By
Parker & Carter
Attorney Reissued Dec. 22, 1931 Re. 18,299

UNITED STATES PATENT OFFICE

JAMES L. BREESE, JR., OF SANTA FE, NEW MEXICO, ASSIGNOR TO OIL DEVICES CORPORATION, OF CHICAGO, ILLINOIS, A CORPORATION OF ILLINOIS

OIL-BURNING APPARATUS

Original No. 1,743,081, dated January 7, 1930, Serial No. 147,217, filed November 9, 1926. Application for reissue filed September 8, 1930. Serial No. 480,604.

My invention relates to a device for burning hydrocarbons, which is particularly adapted for the burning, in heating plants, of a liquid hydrocarbon. One object of my invention is to provide a simple and easily manufactured burning device with a minimum number of moving parts. Another object is the provision of a device of the type described in which the fuel flow may be made responsive to the flow of air to the combustion zone. Another object is the provision of efficient means for cutting off the flow of fuel when necessary. Another object is the provision of a simple and efficient device for the carrying out of the method of combustion described and claimed in my copending application No. 133,798, filed on the 7th day of September, 1926. Other objects will appear from time to time in the course of the specification and claims.

I illustrate my invention more or less diagrammatically in the accompanying drawings, wherein:

Figure 1 indicates a plan view with parts in section and parts broken away;

Figure 2 is a section on the line 2—2 of Figure 1; and

Figure 3 is a section on the line 3—3 of Figure 1.

Like parts are indicated by like symbols throughout the specification and drawings.

It will be realized that I describe and illustrate a burner which is adapted to be used with any suitable furnace, the combustion chamber of the burner being preferably placed within the furnace. Since the furnace forms no part of the present invention and since the mode of application of burners of like class to furnaces is well known, I do not illustrate the furnace.

A indicates any suitable support, herein shown as a column consisting of a plurality of bricks, upon which is mounted the combustion member generally indicated as B. It includes a bottom portion $B^1$ resting on the support A and provided with the upwardly projecting generally cylindrical wall $B^2$, in communication with which is the longitudinal air inlet passage $B^3$ with the reduced terminal portion $B^4$.

Resting upon the upper edge of the wall $B^2$ is a mixing chamber having the bottom portion C, and the cylindrical side wall $C^1$. Exteriorly projecting from the said side wall is the flange $C^2$ provided with a plurality of apertures $C^3$. The flange $C^2$ seats upon the upper edge of the wall $B^2$. The bottom C is apertured as at $C^4$, the aperture being surrounded by the upwardly projecting tube $C^5$.

Resting upon or surrounding the top of said tube is a hood consisting of the top D, the side wall $D^1$ and the bottom portion $D^2$, the side wall having a plurality of apertures $D^3$. Said hood is upwardly slidably removable from the upwardly projecting tube or standpipe $C^5$, which pipe is preferably secured against movement in relation to the bottom portion C of the mixing chamber.

E indicates a cover member having the cylindrical side wall $E^1$ and the upper wall $E^2$ with the central aperture $E^3$. It will be observed from Figure 1 that the wall $E^2$ is upwardly and inwardly inclined over the wall $C^1$ of the mixing chamber. The upper edge of the wall $C^1$ may, if desired, be inclined as at $C^{10}$, to conform to the inclination of the overhanging wall $E^2$. The member $B^2$ and the cover or upper member $E^1$ with its inclined upward and inward extension $E^2$ form in effect an outer housing member surrounding the inner mixing chamber C, $C^1$. This outer housing member forms an expansion chamber. The space between the walls $C^1$ and $E^1$ is of greater cross-sectional area than the space between the wall $B^2$ and the wall $C^1$, and the apertures $C^3$ are restricted in area to reduce the rate of flow into the expansion chamber. Air from the expansion chamber so formed will be delivered to the mixture rising upwardly from the mixing chamber at a pressure substantially less than the pressure of the air at its point of delivery from the standpipe or tube $C^5$ to the distributor or hood D.

G is any suitable pedestal or support upon which is mounted the motor $G^1$ with the associated fan housing $G^2$, in which rotates a motor actuated fan not illustrated in the drawings. $G^3$ is the outlet passage of the casing $G^2$ and is in communication with the reduced passage member $B^4$. $G^4$ is any suitable outer casing or housing with the removable lid $G^5$.

H indicates a fuel line extending to any suitable filter member $H^1$, above which is a float chamber $H^2$ the details of which form no part of the present invention. It will be understood, however, that a valve is provided, controlled for example by the valve stem $H^3$ the end of which projects upwardly through the top of the float chamber $H^2$, as shown in Figure 2. The stem is secured to the trip bucket lever $H^4$ which is pivoted to the upwardly projecting support $H^5$, and is provided with any suitable bucket $H^6$. $H^7$ is any suitable run off pipe from the upper portion of the float chamber through which the surplus oil can escape to the trip bucket $H^6$ in case the float chamber is flooded. $H^8$ is any suitable yielding means normally opposing the weight of the trip bucket and tending to hold the member $H^3$ unseated.

J indicates a fuel line extending from the float chamber $H^2$ to the combustion chamber, to the bottom of which it is connected as at $J^1$. $J^2$ indicates any suitable valve member or housing in which any valve may be positioned, the details of the valve forming no part of the present invention. I may employ, however, any suitable valve stem $J^3$ passing through the bushing $J^4$ screwthreaded into the top of the housing. $J^5$ indicates a stop member, for example a transverse pin, adapted to limit the closing movement of the valve stem $J^3$ to a predetermined minimum. Any desired adjustment may be effected by rotation of the screwthreaded bushing $J^4$ which serves as an abutment for said stop member. The upward movement of the valve stem $J^3$ may be limited by any suitable stop member, herein illustrated as the set screw $J^6$ in screwthreaded relation with the supporting arm $J^7$ and vertically aligned with the valve stem.

In order to actuate the valve stem in response to air pressure conditions I provide a flexible diaphragm K with the opposed rigid member $K^1$. $K^2$ indicates an air inlet pipe which preferably terminates within the reduced air passage portion $B^4$. $K^3$ is a lever pivoted as at $K^4$ to the upwardly projecting support $K^5$ and connected, intermediate its ends, to the diaphragm, by the connecting member $K^6$. Its opposite end engages the valve stem $J^3$, which moves up or down in response to rotation of the lever $K^3$.

It will be realized that whereas I have shown a practical and operative device, nevertheless many changes might be made in size, shape, number and distribution of parts without departing from the spirit of my invention. I therefore wish my drawings and description to be taken as in a broad sense illustrative or diagrammatic rather than as limiting me to my specific description and showing.

The use and operation of my invention are as follows:

I have described, in my copending application, No. 133,798, above referred to, a method of combustion in which a hydrocarbon, for example a liquid hydrocarbon, is burned with great efficiency and with a minimum of carbon separation and deposit. The present device is adapted for the efficient carrying out of the same process. The main steps or characteristics of the process are the supply of the hydrocarbon, for example in liquid form, to the lower portion of a mixing and gasifying zone. The hydrocarbon is preferably gasified by the radiant heat of the combustion going on in the upper portions or above the top of the mixing and gasifying zone. It will be understood that any suitable means may be employed for initiating the combustion.

As the gasified hydrocarbon rises from the bottom of the member C, it is mixed with the primary air laterally flowing through the apertures $D^3$. The air is preferably supplied in sufficient quantities to mingle freely with the gasified hydrocarbon to form a mixture which is preferably not quite combustible. The extent of this primary air supply depends upon the number and cross section of the apertures $D^3$. It will be observed that the jets of air flowing through these apertures are sufficient to cause a very complete mingling or mixture of the air and the hydrocarbon, the air supply being sufficient for substantial or complete hydroxylation of the hydrocarbon.

As the mixture so formed rises upwardly past the upper edge of the wall $C^1$ it is met by the secondary air supply which flows inwardly and upwardly along the wall $E^2$. This secondary air holds the form of a cone until it reaches the central aperture $D^3$, when it is upwardly bent and flows into whatever combustion chamber my device is employed to heat. It will be understood that as the secondary air pursues its conic path the mixed primary air and hydrocarbon flows up into the center of the cone so formed and a mixture begins which is preferably completed above the inner edge of the wall $E^2$. It is important that the secondary air flow upwardly, in the burner herein disclosed, in order that there shall be no back eddies and downward current of secondary air into the zone of mixture of the fuel and the primary air. It is essential to the practical operation of my device that the mixture of the hydrocarbon and the relatively sparse supply of primary air be completed before the mingling of the mixture so formed with the secondary supply of air takes place. Otherwise the balance whereby hydroxylation of the fuel takes place is disturbed and carbon deposit and inefficient combustion results.

In the practical operation of my device I prefer to control the flow of fuel in response to changes in the flow of air. In employing an electric motor I may provide any suitable thermostatic or control means, which forms no part of the present invention, in order to control the rotation of the motor. I provide air responsive means, for instance the diaphragm shown in Figure 3, whereby an increase in air pressure in the passage $B^3$ or $B^4$, in response to actuation of the fan, lifts the needle valve $J^3$ to open position. A decrease in air pressure permits the valve to drop. I preferably but not necessarily provide a limit to the valve movement which permits a predetermined minimum flow of fuel, the combustion of the small amount of fuel so provided being maintained by natural draft. The maximum and minimum settings of the needle $J^3$ are adjustably controlled, as for example by rotation of the bushing $J^4$ and the set screw $J^6$ respectively.

In case the float chamber $H^2$ becomes flooded, or an excess supply of fuel is being provided, oil runs through the run off passage $H^7$ and fills the bucket $H^6$ until the spring $H^8$ is compressed and the valve $H^3$ is closed.

I find it advantageous to form the hood or air distributor D separate from the tube or standpipe $C^5$. In the form of my device shown in Figure 2 the distributor member may be slid upwardly from the tube $C^5$ for easy removal through the top of the mixing chamber and through the aperture $E^3$. This is important, for example, in the manufacture of the device, since in practice it is preferable, accurately to drill out or form the apertures $D^3$ in the distributor D. It is therefore cheaper and more efficient to employ a readily removable distributor member. A further advantage is ready removability of the distributor in case of breakage or deterioration because of heat, or in case of need for cleaning. It will be noted that the standpipe $C^5$ projects upwardly into the mixing chamber substantially above the normal fuel level as controlled by the trip bucket $H^6$.

I find it advantageous to deliver the secondary air to the mixture at a different and preferably lower pressure than the pressure at which the primary air is delivered from the standpine $C^5$ to the distributor D $D^1$. In effect the space between the walls $C^1$ and $E^1$ serves as an expansion chamber, and an area of reduced air pressure, the access of air thereto being through the relatively restricted apertures $C^3$.

I claim:

1. In a hydrocarbon burner, a housing, an open-topped mixing chamber positioned within said housing, the side walls of said chamber being spaced from the walls of said housing, a fuel line extending to said mixing chamber, an axial air inlet passage extending upwardly from the bottom of said mixing chamber, an air distribution member associated with said passage, means for delivering air into the space between the mixing chamber and the housing, and means for directing air from the said space across the upper edge of said mixing chamber.

2. In a hydrocarbon burner, a housing, an air inlet passage in communication with said housing, an open-topped mixing chamber positioned within said housing and open to direct radiation from above, the side walls of said chamber being spaced from the walls of said housing, a fuel line extending to said mixing chamber, an axial primary air inlet passage extending upwardly from the bottom of said mixing chamber, an air distribution member associated with the last said passage and situated above the bottom of the mixing chamber and below the top thereof, said distribution member being provided with a plurality of apertures adapted to direct primary air outwardly toward the side wall of the mixing chamber and means to supply secondary air from the space between said housing and chamber to the gas rising from said mixing chamber to effect combustion thereof.

3. In a hydrocarbon burner, a housing, an open-topped cylindrical mixing chamber positioned within said housing, the side walls of said chamber being spaced from the walls of said housing, a fuel line extending to said mixing chamber, an axial air inlet passage extending upwardly from the bottom of said mixing chamber, an air distribution member associated with said passage, and means for delivering air into the space between the walls of the housing and the mixing chamber, means for directing air from the said space across the upper edge of the wall of the mixing chamber, and a connecting partition intermediate the cylindrical wall of the mixing chamber and the surrounding wall of the housing, said partition being provided with a plurality of apertures for the passage of air upwardly.

4. In a hydrocarbon burner a housing into which air is delivered, an open-topped mixing chamber located within the housing having side walls spaced from the side walls of the housing, means whereby air is delivered from the housing into the mixing chamber through an opening of restricted area, a fuel line leading into the mixing chamber, an air distributor surrounding the opening from the housing into the mixing chamber, arranged to disperse the air and deliver it radially into the mixing chamber intermediate the top and bottom thereof, and means for directing air from the space between the walls of the housing and mixing chamber upwardly about the edge of the latter to comingle with the fuel mixture issuing from the mixing chamber.

5. In a hydrocarbon burner, a housing into which air is delivered, an open-topped mixing chamber located within the housing and open to direct radiation from above, said mixing chamber having side walls spaced from the side walls of the housing, means whereby primary air is delivered from the housing into the mixing chamber through an opening of restricted area, a fuel line leading into the mixing chamber, and a removable air distributor surrounding the opening from the housing into the mixing chamber and arranged to disperse air and deliver it into the mixing chamber and means to supply secondary air to the mixture issuing from said mixing chamber.

6. In a hydrocarbon burner, an outer housing, and an air supply passage extending thereto, an open-topped mixing chamber positioned within said housing, the wall of said chamber being spaced inwardly from the wall of said housing, an apertured connecting member connecting the housing wall and the mixing chamber, said connecting wall being located at a level below the plane of the upper edge of the mixing chamber wall, means to supply primary air to the interior of the mixing chamber, and means to direct secondary air flowing through said connecting member into admixture with the fuel mixture arising from said mixing chamber at an angle to said rising fuel mixture.

7. In a hydrocarbon burner, a housing into which air is delivered, an open-topped mixing chamber located within the housing, said mixing chamber having side walls spaced from the side walls of the housing, means for delivering fuel to said mixing chamber, means to supply primary air to said mixing chamber, a partition connecting the side walls of the housing and mixing chamber, said partition being apertured to permit the passage of secondary air therethrough, and an annular expansion chamber positioned above said partition member, below the upper edge of the mixing chamber, and means for directing air from said expansion chamber across the upper edge of the mixing chamber to the mixture delivered from the mixing chamber.

8. In a hydrocarbon burner, a housing into which air is delivered, an open-topped mixing chamber located within the housing, said mixing chamber having side walls spaced from the side walls of the housing, means for delivering fuel to said mixing chamber, means to supply primary air to said mixing chamber, a partition connecting the side walls of the housing and mixing chamber, said partition being apertured to permit the passage of air therethrough, and an expansion chamber positioned above said partition, about the upper edge of the mixing chamber, and means to direct the air flowing from said expansion chamber toward the mixture arising from said mixing chamber.

9. In a hydrocarbon burner, a housing into which air is delivered, an open-topped mixing chamber located within the housing, said mixing chamber having side walls spaced from the side walls of the housing, means for delivering fuel to said mixing chamber, means to supply primary air to said mixing chamber, a partition connecting the side walls of the housing and mixing chamber, said partition being apertured to permit the passage of secondary air therethrough, and an expansion chamber positioned above said partition, about the upper edge of the mixing chamber, and means for directing air from said expansion chamber upwardly and inwardly in relation to the mixture delivered from the mixing chamber.

10. In a hydrocarbon burner, a housing into which air is delivered, a mixing chamber located within the housing, a fuel line leading into the mixing chamber, means to supply primary air to said mixing chamber, an expansion chamber positioned about said mixing chamber, and means for admitting secondary air from the housing into the expansion chamber and for maintaining in said expansion chamber a pressure less than the pressure within said housing, and means for delivering air from said expansion chamber to the mixture delivered from the mixing chamber.

11. In a hydrocarbon burner, a housing into which air is delivered, a mixing chamber located within the housing, a fuel line leading into the mixing chamber, means whereby primary air is delivered into the mixing chamber, and means for delivering secondary air to the mixture so produced, as it escapes from the mixing chamber, at a pressure less than the pressure of the air delivered into the mixing chamber.

12. In a hydrocarbon burner, a housing into which air is delivered, a mixing chamber located within the housing, a fuel line leading into the mixing chamber, means whereby primary air is delivered into the mixing chamber, including an aperture at the bottom of the mixing chamber, and an air distributor member associated with said aperture, and means for delivering air into said distribution member at a predetermined pressure, and means for delivering secondary air to the mixture so formed at a lower pressure.

13. In a hydrocarbon burner, a housing into which air is delivered, a mixing chamber located within the housing, a fuel line leading into the mixing chamber, means whereby primary air is delivered into the mixing chamber, including an aperture at the bottom of the mixing chamber, and an air distribution member associated with said aperture, and means for delivering air into said distribution member at a predetermined pressure, and means for delivering secondary air to the mixture so formed at a different pressure.

14. In a hydrocarbon burner, a housing into which air is delivered, an open-topped mixing chamber located within the housing, a fuel line leading into the mixing chamber, means whereby primary air is delivered into the mixing chamber, including an aperture at the bottom of the mixing chamber, and an air distribution member associated with said aperture, and means for delivering air to said distribution member at a predetermined pressure, and means for delivering secondary air to the mixture so formed adjacent the periphery of the opening of the mixing chamber, at a different pressure.

15. In a hydrocarbon burner, a housing into which air is delivered, an open-topped mixing chamber located within the housing, a fuel line leading into the mixing chamber, means whereby primary air is delivered into the mixing chamber, including an aperture at the bottom of the mixing chamber, and an air distribution member associated with said aperture, and means for delivering air to said distribution member at a predetermined pressure, and means for delivering secondary air to the mixture so formed adjacent the periphery of the opening of the mixing chamber, at a lower pressure.

16. In a hydrocarbon burner, a housing into which air is delivered, an open-topped mixing chamber located within the housing and spaced therefrom, a fuel line leading into the mixing chamber, means to supply primary air into said mixing chamber from said housing, a partition in said housing extending therebetween and said mixing chamber, said partition being apertured and arranged to form a chamber below and a chamber above, said upper chamber being provided with an outlet of greater effective area than the area of said apertures in said partition to deliver air from said upper chamber into admixture with the fuel mixture arising from said mixing chamber.

Signed at Sante Fe, county of Santa Fe, and State of New Mexico, this 30 day of August, 1930.

JAMES L. BREESE, Jr.